(12) United States Patent
Chiu et al.

(10) Patent No.: US 8,015,013 B2
(45) Date of Patent: Sep. 6, 2011

(54) METHOD AND APPARATUS FOR ACCESSING A DIGITAL FILE FROM A COLLECTION OF DIGITAL FILES

(75) Inventors: Chi Fai Chiu, Hong Kong (HK); Hing Fai Louis Chong, Hong Kong (HK); Ching Wai Jimmy Lee, Hong Kong (HK); Hong Chung Leung, Hong Kong (HK); Chi Wai Dennis Wee, Hong Kong (HK); Wei To William Wang, Hong Kong (HK)

(73) Assignee: Creative Technology Ltd, Singapore (SG)

( * ) Notice: Subject to any disclaimer, the term of this patent is extended or adjusted under 35 U.S.C. 154(b) by 832 days.

(21) Appl. No.: 11/637,357

(22) Filed: Dec. 11, 2006

(65) Prior Publication Data

US 2007/0136065 A1   Jun. 14, 2007

(30) Foreign Application Priority Data

Dec. 12, 2005 (SG) ................................ 200508000-7

(51) Int. Cl.
    *G10L 11/00* (2006.01)
    *G06F 17/20* (2006.01)
    *G06F 17/30* (2006.01)
(52) U.S. Cl. .............................. 704/270; 704/8; 707/706
(58) Field of Classification Search .................... None
See application file for complete search history.

(56) References Cited

U.S. PATENT DOCUMENTS 4,833,714 A * 5/1989 Shimotani et al. ............ 704/253
5,479,488 A * 12/1995 Lennig et al. ............... 379/88.04

(Continued)

FOREIGN PATENT DOCUMENTS

EP      0611135      8/1994

OTHER PUBLICATIONS

Hong-wen Sie et al., "A multilingual automatic speech recognition (ASR) engine embedded on personal digital assistant (PDA)", 9th International Workshop on Cellular Neural Networks and Their Applications, May 28-30, 2005.

(Continued)

*Primary Examiner* — Brian L Albertalli
(74) *Attorney, Agent, or Firm* — Creative Technology Ltd

(57) ABSTRACT

There is provided a method for accessing at least one digital file from a collection comprising more than one digital file in an electronic device, including: generating one index comprising of information entries obtained from each of the more than one digital file in the collection, with each digital file in the collection information being linked to at least one information entry; receiving a speaker independent speech input in at least one language during a speech reception mode; determining a language of the speech input; and setting the speech reception mode to the language of the speech input; comparing the speech input received during the speech reception mode with the entries in the index. The file may advantageously be accessed when the speech input coincides with at least one of the information entries in the index. The digital files may be stored in the electronic device, any device functionally connected to the electronic device or a combination of the aforementioned. The at least one digital file may be received from a source selected from: a memory device, a wired computer network or a wireless computer network. An apparatus that is able to carry out the aforementioned method is also disclosed.

21 Claims, 3 Drawing Sheets

U.S. PATENT DOCUMENTS

| | | | |
|---|---|---|---|
| 6,081,774 A * | 6/2000 | de Hita et al. | 704/9 |
| 6,243,675 B1 * | 6/2001 | Ito | 704/232 |
| 6,907,397 B2 * | 6/2005 | Kryze et al. | 704/251 |
| 7,046,984 B2 * | 5/2006 | Liu et al. | 455/403 |
| 7,321,852 B2 * | 1/2008 | Stanford | 704/235 |
| 7,376,648 B2 * | 5/2008 | Johnson | 1/1 |
| 2002/0099533 A1 * | 7/2002 | Jaqua | 704/1 |
| 2002/0184003 A1 | 12/2002 | Hakkinen | |
| 2002/0193989 A1 | 12/2002 | Geilhufe | |
| 2003/0050779 A1 | 3/2003 | Riis | |
| 2003/0177013 A1 | 9/2003 | Falcon | |
| 2004/0249635 A1 | 12/2004 | Bennett | |
| 2005/0033575 A1 | 2/2005 | Schneider | |
| 2006/0047498 A1 * | 3/2006 | Fux et al. | 704/3 |
| 2006/0074898 A1 * | 4/2006 | Gavalda et al. | 707/4 |
| 2006/0149548 A1 | 7/2006 | Wang | |
| 2006/0206331 A1 | 9/2006 | Hennecke | |
| 2006/0229864 A1 * | 10/2006 | Suontausta et al. | 704/8 |
| 2008/0306729 A1 * | 12/2008 | Drissi et al. | 704/8 |

OTHER PUBLICATIONS

Schulz et al., "A Spoken Language Front-end for a Multilingual Music Data Base", Proceedings of the Berliner XML-Tage, Mar. 13, 2004, available online at http://www.dfki.de/~romanell/BerlinerXMLTage2004.pdf.

Wang et al., "Speech-controlled Media File Selection on Embedded Systems", 6th SIGdial Workshop on Discourse and Dialogue, Sep. 2-3, 2005.

Baumann et al., "Super-convenience for Non-musicians: Querying MP3 and the Semantic Web", Proceedings of the International Conference on Music Information Retrieval, 2002.

* cited by examiner

METHOD AND APPARATUS FOR ACCESSING A DIGITAL FILE FROM A COLLECTION OF DIGITAL FILES

FIELD OF INVENTION

This invention relates to a method and apparatus for accessing a digital file from a collection of digital files, and particularly relates to the accessing of files using speech input.

BACKGROUND

Devices with speech activated control mechanisms are steadily increasing in popularity. Mobile phones with "voice dial" and speech-activated toys are some of these devices that one can readily find nowadays.

However, such devices usually require pre-programming to associate a voice input with a particular entry (in a mobile phone, the entry is a particular entity's contact number). This can be a tedious process when it involves a large number of entries, such as, for example, in address books and in a collection of media files. This makes such a feature undesirable to a user because of the inconvenience.

There are speech recognition features incorporated in some devices today that do not require pre-programming. However, technology is still not mature enough to be able to overcome the difficulty of recognising heavily accented or mumbled English. In addition, while English is the language of choice for the interconnected global village of this digital age, it is not the only language in use. Populous countries in the world like China and India do not have a predominantly English-speaking populace, and these devices with smart speech recognition features may not be widely adopted in these countries. These huge consumer markets represent lost opportunities for corporations if their needs are not being specifically met.

Such "smart" devices do not have multiple language recognition capabilities at this moment. As such, the makers of such devices are required to make different versions of the same product for markets with language capabilities other than English, and this inadvertently increases the cost of manufacturing each device, since either a dedicated production line/facility is required, or a production line/facility for the English version needs to be modified as and when required to produce the other versions.

It is also a challenge for "smart" devices that have multiple language recognition capabilities to properly manage and administer the different character code sets such as, for example, ASCII for Anglo-alphanumeric based languages, Big-5 for Traditional Chinese, GB for Simplified Chinese, JIS for Japanese and the like.

SUMMARY

In a first aspect of the present invention, there is provided a method for accessing at least one digital file from a collection comprising one than one digital file in an electronic device, including: generating one index comprising of information entries obtained from each of the more than one digital file in the collection, with each digital file in the collection information being linked to at least one information entry; receiving a speaker independent speech input in at least one language during a speech reception mode; determining a language of the speech input; and setting the speech reception mode to the language of the speech input; comparing the speech input received during the speech reception mode with the entries in the index. The file may advantageously be accessed when the speech input coincides with at least one of the information entries in the index. The digital files may be stored in the electronic device, any device functionally connected to the electronic device or a combination of the aforementioned. The at least one digital file may be received from a source selected from: a memory device, a wired computer network or a wireless computer network.

Preferably, the digital file may be of the type such as documents, spreadsheets, playlists, folders, music files, image files and video files. It is also preferable that the information entry comprises at least one word and obtains information from the digital file such as, for example, file name, file extension, song title from file metadata, artiste name from file metadata, truncated song title from file metadata, truncated artiste name from file metadata, translated song title or alternative song title. The information entry may be in any language.

The speech input may be either in one language or a phrase of at least one language. The speech reception mode may be set either manually or automatically.

Preferably, the electronic device may be a desktop computer, a notebook computer, a PDA, a portable media player, or a mobile phone. The facility of accessing at least one digital file in the electronic device may be by depressing a predetermined button at least once.

In a second aspect of the present invention, there is provided an apparatus for accessing at least one digital file from a collection comprising more than one digital file stored within the apparatus.

The apparatus includes: an indexer for generating an index comprising of information entries obtained from each of the more than one digital file in the collection, with each digital file in the collection information being linked to at least one information entry; a speech reception means for receiving a speaker independent speech input in at least one language during a speech reception mode; a processor to determine a language of the speech input; and the processor being able to compare the speech input received during the speech reception mode with the entries in the index. Advantageously, the file is accessed when the speech input coincides with at least one of the information entries in the index. The apparatus may be selected from the group comprising: desktop computer, notebook computer, PDA, portable media player and mobile phone.

It is preferable that the speech reception means is a microphone. The language of the speech input may be selected either automatically or manually. The speech input may be in one language or a phrase of at least one language.

The information entries may preferably comprise at least one word in any language. The information entry may obtains information from the digital file such as, for example, file name, file extension, song title from file metadata, artiste name from file metadata, truncated song title from file metadata, truncated artiste name from file metadata, translated song title and alternative song title.

The apparatus may including at least one button to activate a facility to access a digital file by depressing the at least one button at least once. The apparatus may preferably include a display.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

The following discussion is intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
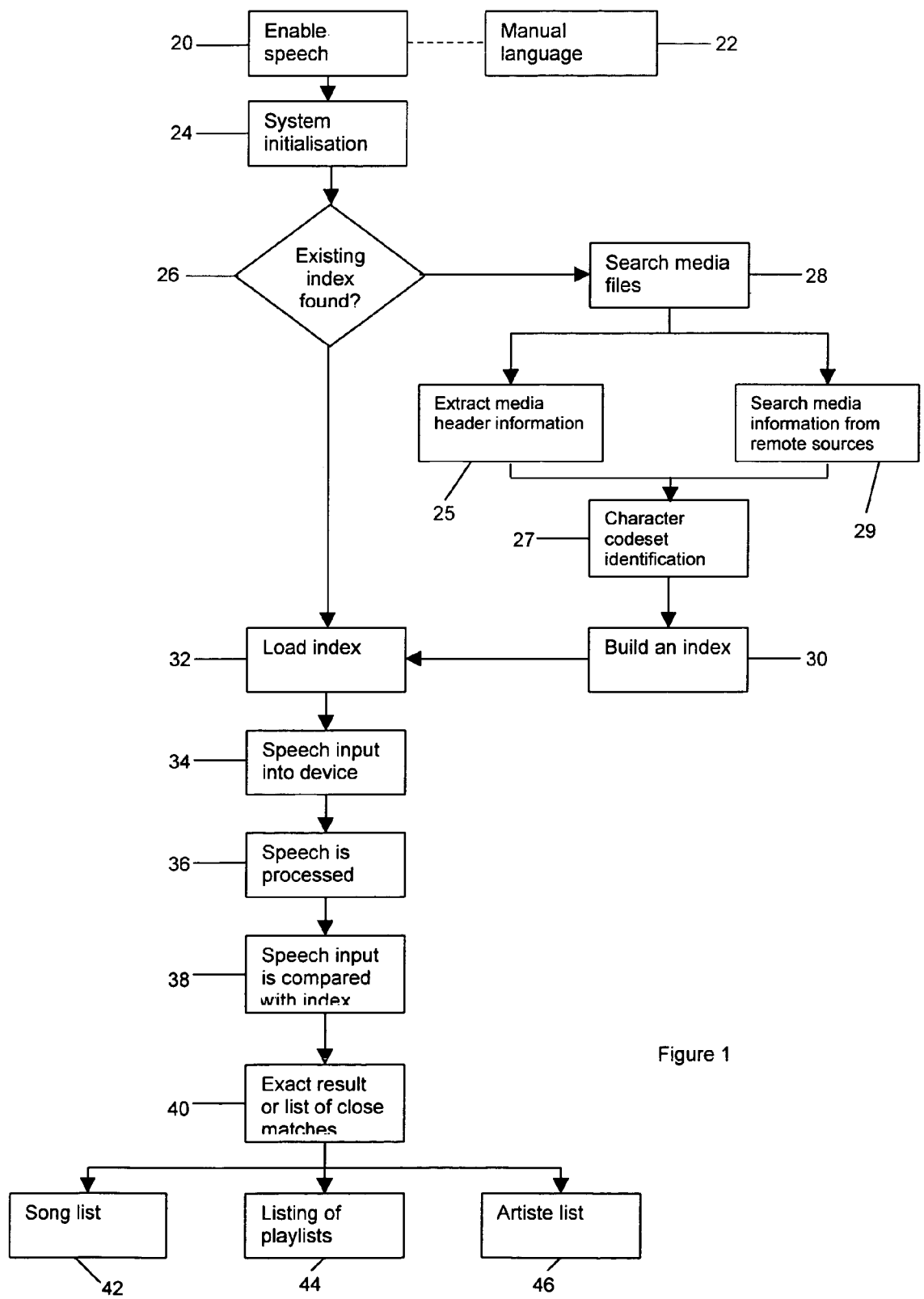
FIG. 1 shows a flow chart of a process of a preferred embodiment of the present invention.

Referring to FIG. 1, there is disclosed a flow chart showing a preferred embodiment of a method for accessing at least one digital file from a collection comprising more than one digital file in an electronic device. The electronic device may be for example, a desktop computer, a notebook computer, a PDA, a portable media player, or a mobile phone. The digital files in the collection may include: documents, spreadsheets, playlists, folders, music files, and video files. In this embodiment shown in FIG. 1, the digital files stored in the collection are media files (image, music and video files). The at least one digital file may be received from a source such as, for example, a memory device, a wired computer network or a wireless computer network. The collection of digital files may reside in the memory device in the electronic device or a memory device that is connectable to the electronic device. The memory devices may be non-volatile memory and may be either flash memory or a hard disk drive.

Firstly, a facility to enable a speech reception mode is activated 20 in the electronic device. The electronic device may have a display showing a menu from which this facility is selectable, or the device may have a shortcut switch/button that is depressed at least once to activate the speech reception mode. At this juncture, a user may be able to manually select a specific language or multiple languages for speech input 22. This aids the device in processing the speech input. It should be noted that each dialect of a particular language such as, for example, the chinese dialects of Cantonese, Teochew and Hokkien among others is considered to be a different language.

Subsequent to enabling the speech reception mode, a system for accessing a digital file from a collection in an electronic device is initialised 24 in preparation of incoming speech inputs for accessing the files in the collection. During the initialisation process, there is a check to confirm the existence of any information index 26 with information of the files in the collection.

If no index is found, fewer digital files have been detected (files have been deleted), or new digital files have been detected, media files in the electronic device and any connected memory device are searched 28. The information extracted 25 and indexed from each file may include at least one of the following: file name, file extension, song title from file metadata, artiste name from file metadata, truncated song title from file metadata, truncated artiste name from file metadata, and alternative song title. The aforementioned information may also be obtained from alternative sources 29, such as, for example, the internet or a host if the electronic device is connected to the alternative source. Each information entry should comprise at least one word. The extracted information may be in any language and need not be Anglo alphanumeric alphabet based. The various forms of Chinese characters (simplified and traditional), various forms of Japanese characters (kanji, hiragana and katakana), Korean characters, Islamic characters and the like may all be extractable and stored in the information index. Transliteration of the aforementioned non-English characters into English may also be stored in the information index. Translations of the aforementioned non-English characters to English may also be stored in the information index if such information is included in the file metadata. It may be possible that each digital file has a plurality of information entries in the information index so as to enable the file to be accessed via various paths such as, for example, by artiste name, by song title, by file name and so forth. In the case where fewer files have been detected, the information entries of non-existent files are removed when creating the index. A user may also give a particular song an alternative title and this alternative title may also be included in the index. After all information about the media files are gathered, a character codeset identification function 27 analyzes the information of each media file and identifies the codeset or codesets used in each file.

An index of all the information entries from each digital file in the electronic device and any functionally connected memory device together with the character codeset information is then formed in the electronic device 30, and subsequent to the building of the index, the index is loaded in the electronic device 32 such that all the information entries in the index are accessible. The information index may also be loaded 32 after confirming the existence of an information index 26, if no new digital files have been detected and if no digital files are deleted from when the information index was built.

It should be noted that the duration of time required for the aforementioned steps is dependent on data processing speed, memory I/O speed and network/remote server latency. It is apparent that the greater the digital files, the longer the duration required for the aforementioned steps due to the volume of data to be processed.

At this juncture, the electronic device is ready to receive a speech input. The electronic device may either sound an audible alert or show a visual alert to prompt a user that it is ready to receive speech input in a sound reception mode. The speech input is speaker independent. No pre-recording is required and the electronic device is basically "pick-and-use". Speech processing in the method may be sufficiently robust to be able to distinguish the speech input in spite of any particularly strong accents or mumbling. The speech is input into the electronic device 34. The speech input may be in one language. The speech input may also be a phrase comprising more than one language. For example, a song title like "帝女 flower" may be acceptable and able to be processed. For digital files with translated titles in their metadata, use of either the original or translated title allows access to the same digital file. For example, "愛是不保留" or "No Reserve In Love" allows access to the same digital file.

Figure 3:
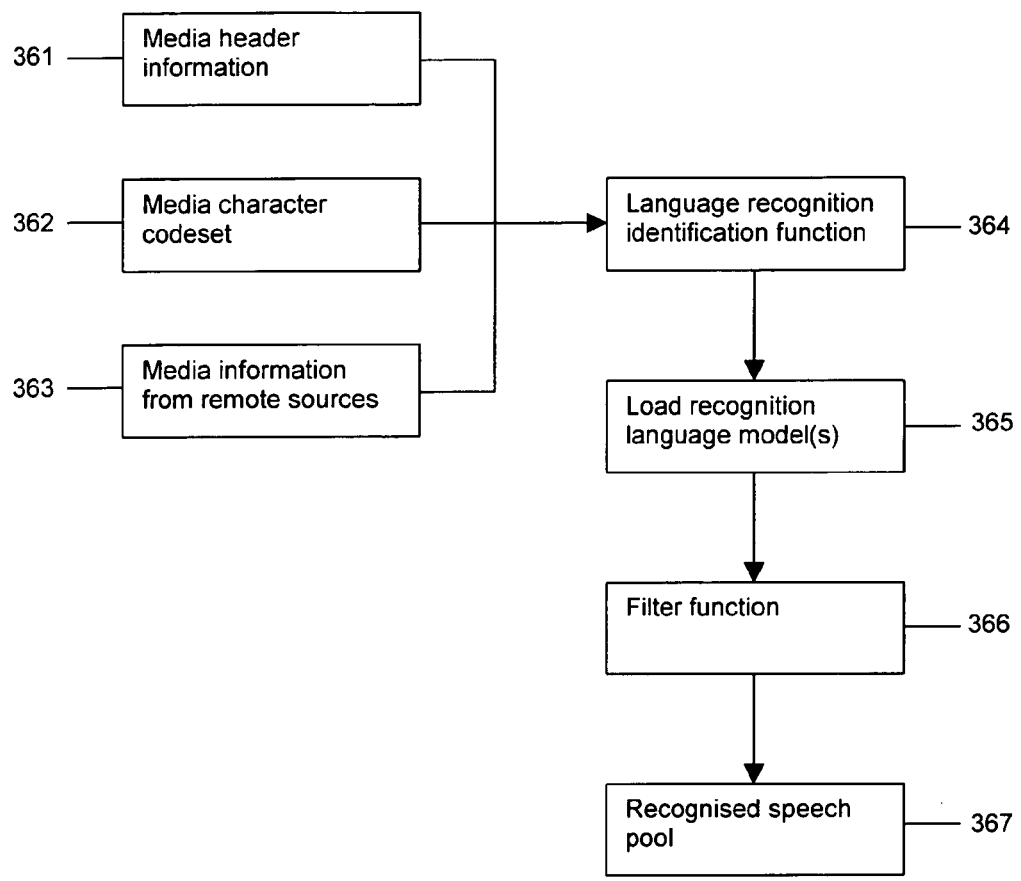
FIG. 3 shows an enlargement of the speech processing process 36 in FIG. 1.

After the speech is input into the electronic device, the speech is processed 36. If language selection was not done 22 earlier manually, the language of the speech input is determined and the appropriate speech reception mode correlating to the language of the speech input is automatically set. If the language selection is set manually, then a language model specified by the user will be loaded correspondingly. This allows for an accurate determination of the speech input. Referring to FIG. 3, there is described the sequence that the speech is processed automatically. The media header information 361 obtained in 25, the character codeset 362 obtained in 27 and media information 363 gathered from remote sources in 29 are entered into a language recognition identification function 364 to enable the most appropriate speech recognition language model(s) to be loaded 365. For example, if the language recognition identification function determines that the codesets used in the media files are ASCII and GB while the country of origins are the United States of America (USA) and the Peoples' Republic of China (PRC), both the USA English language model and the PRC Putonghua language model will be loaded for voice recognition. Subsequently, the speech input is further "filtered" 366 where meaningful media information such as song titles, artist and album is extracted from the speech input and provided to a speech recognizer as subjects for speech recognition. For example, with a speech input of "Play 愛是不保留 by Sharon Lau", "愛是不保留" will be extracted as song title information while "Sharon Lau" will be intelligently extracted as artiste information. This extracted information is then added to the speech recognition pool 367. Filtering is also done on the speech input to determine the entries into the recognised speech pool when the manual selection of language 22 is done.

Subsequent to processing the speech input and ascertaining the entries into the recognised speech pool, the input is compared with the information entries in the index 38. When a match between the input and at least one information entry is made, the digital file(s) linked to the information entry(s) are displayed 40 for the user's selection. The digital file(s) shown may be a result list and the user may be able to select a desired song 42, a desired playlist 44 or songs from a desired artiste 46. These options are merely for illustrative purpose and are not limiting.

Figure 2:
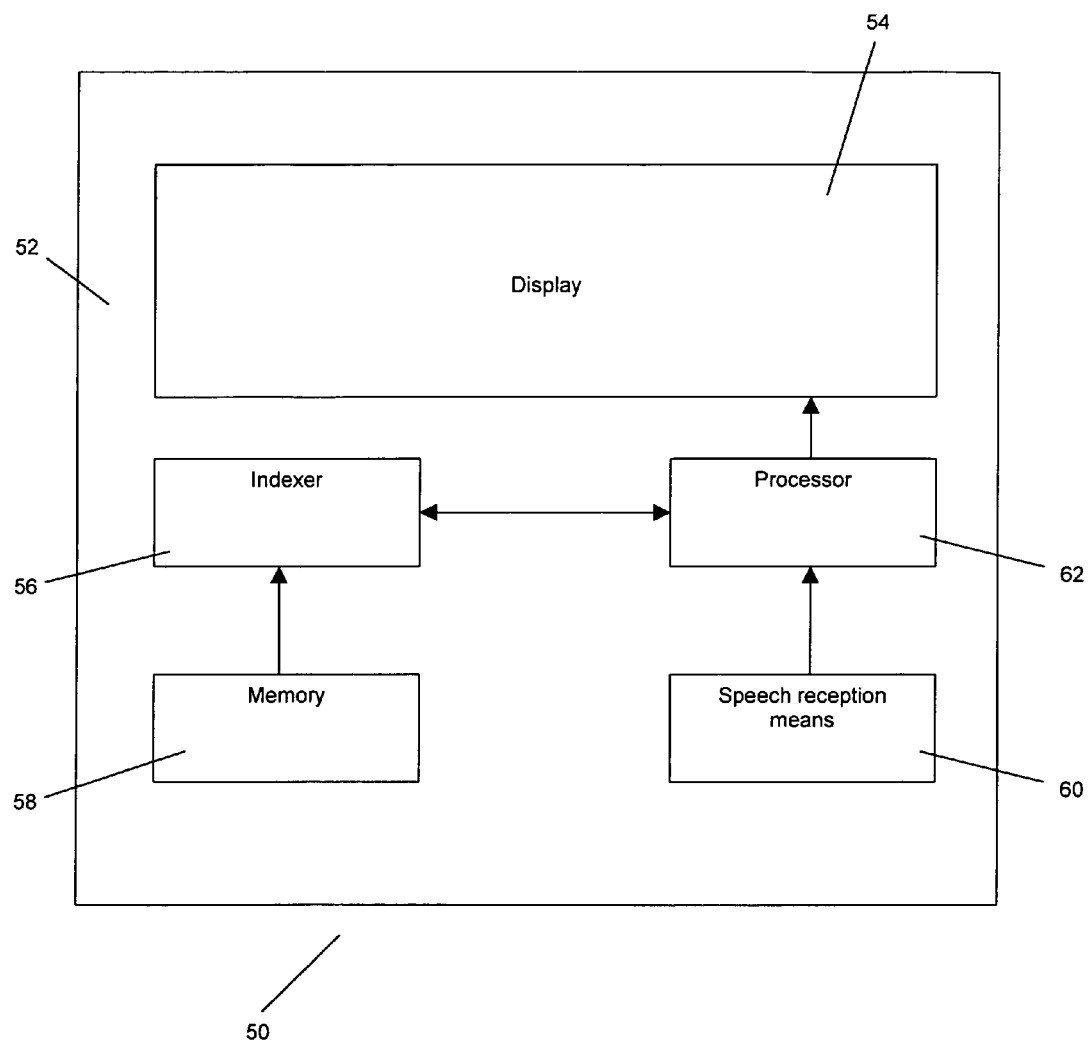
FIG. 2 shows a schematic diagram of an apparatus of a preferred embodiment of the present invention.

Referring to FIG. 2, there is shown an apparatus 50 for accessing at least one digital file from a collection comprising more than one digital file stored within the apparatus 50. The apparatus 50 may be a device such as, for example, a desktop computer, a notebook computer, a PDA, a portable media player, or a mobile phone. The digital files may be files such as, for example, documents, spreadsheets, playlists, folders, music files, or video files. The at least one digital file may be received from a source such as, for example, a memory device, a wired computer network, or a wireless computer network. The collection of digital files may reside in a memory device 58 included in the apparatus 50 or the digital files may reside in a separate memory device that may be connectable to the apparatus 50. The memory device may be non-volatile memory and may be either flash memory or a hard disk drive. In order to activate the facility to access a digital file, the apparatus 50 may have a display 54 showing a menu that allows this facility to be enabled, or the apparatus 50 may have a shortcut switch/button (not shown) that is depressed at least once to activate the facility.

The apparatus 50 may have a housing 52 to contain its various components. The apparatus 50 may have a display 54 for displaying information of the apparatus 50, including information about the files stored in the apparatus 50 or accessible to the apparatus 50. There may be an indexer 56 for generating an index comprising of information entries obtained from each of the more than one digital file in the collection. Each digital file in the collection information may be linked to at least one information entry. The information entry may comprise at least one word and may be in any language. The information extracted and indexed from each file may include at least one of the following: file name, file extension, song title from file metadata, artiste name from file metadata, truncated song title from file metadata, truncated artiste name from file metadata, truncated song title and alternative song title. Each information entry should comprise at least one word. The extracted information may be in any language and need not be Anglo alphanumeric alphabet based. The various forms of Chinese characters (simplified and traditional), various forms of Japanese characters (kanji, hiragana and katakana), Korean characters, Islamic characters and the like may all be extractable. Transliteration of the aforementioned non-English characters into English may also be stored in the information index. Translations of the aforementioned non-English characters to English may also be stored in the information index if such information is found in the file metadata. It may be possible that each digital file has a plurality of information entries in the information index so as to enable the file to be accessed via various paths such as, for example, by artiste name, by song title, by file name and so forth. The user may also give a particular song an alternative title and this alternative title may also be included in the index.

In addition, the apparatus 50 may include a speech reception means 60 for receiving a speech input in at least one language during a speech reception mode. The speech reception means may be a microphone or any other device that allows for the input of audio signals. The speech reception means 60 passes on speech input to a processor 62. The speech input may be in one language. The speech input may also be a phrase comprising more than one language. For example, a song title like "帝女 flower" may be understood. For digital files with translated titles in their metadata, use of either title allows access to the same digital file. For example, "愛是不保留" or "No Reserve in Love" allows access to the same digital file. The processor 62 may be able to determine a language of the speech input automatically. The apparatus 50 may also be able to manually set the language of the speech input such that the processor 62 does not need to carry out the task automatically. The processor 62 may also be used to compare the speech input received during the speech reception mode with the entries in the index. The speech input is speaker independent. No pre-recording is required and the apparatus 50 is basically "pick-and-use". The speech recognition module in the apparatus 50 may be sufficiently robust to be able to distinguish the speech input in spite of any particularly strong accents and mumbling.

When a match between the input and at least one information entry is made, the digital file(s) linked to the information entry(s) are shown on the display 54 for the user's selection. The digital file(s) shown may be a result list and the user may be able to select a desired song, a desired playlist or songs from a desired artiste. These options are merely for illustrative purpose and are not limiting.

It should be noted that the arrows in FIG. 2 denote the direction of data flow between the various components of apparatus 50.

Whilst there has been described in the foregoing description preferred embodiments of the present invention, it will be understood by those skilled in the technology concerned that many variations or modifications in details of design or construction may be made without departing from the present invention.

The invention claimed is:

1. A method for accessing with an electronic device at least one digital file from a collection comprising more than one digital file in the electronic device, including:
   generating one index comprising of information entries obtained from each of the more than one digital file in the collection, the information entries including transliterations of non-English information entries, with each digital file in the collection information being linked to at least one information entry;
   receiving a speaker independent speech input in more than one language during a speech reception mode;
   setting the speech reception mode to the more than one language of the speech input, the speech input being filtered to extract meaningful media information;
   determining the more than one language of the speech input in a manner such that appropriate speech reception mode correlating to the language of the speech is capable of being automatically set; and
   comparing the speech input received during the speech reception mode with the entries in the index,
   wherein the file is accessed when the speech input coincides with at least one of the information entries in the index.

2. The method of claim 1, wherein the digital file is selected from the group comprising: documents, spreadsheets, playlists, folders, music files, image files and video files.

3. The method of claim 1, wherein the information entries comprise at least one word.

4. The method of claim 1, wherein the information entry obtains information from the digital file selected from the group comprising: file name, file extension, song title from file metadata, artiste name from file metadata, truncated song title from file metadata, truncated artiste name from file metadata, translated song title, alternative song title and any of the aforementioned from a remote source.

5. The method of claim 1, wherein the information entry is in any language and is dependent on at least one character codeset.

6. The method of claim 1, wherein the speech input is in a form of a phrase.

7. The method of claim 1, wherein the digital file is stored a source selected from the group comprising: the electronic device, any device functionally connected to the electronic device and a combination of the aforementioned.

8. The method of claim 1, wherein the language of the speech reception mode is further set by means comprising manual selection.

9. The method of claim 1, wherein the at least one digital file is received from a source selected from the group comprising: a memory device, a wired computer network and a wireless computer network.

10. The method of claim 1, wherein the electronic device is selected from the group comprising: desktop computer, notebook computer, PDA, portable media player and mobile phone.

11. An apparatus for accessing at least one digital file from a collection comprising more than one digital file stored within the apparatus, including:
    an indexer for generating an index comprising of information entries obtained from each of the more than one digital file in the collection, the information entries including transliterations of non-English information entries, with each digital file in the collection information being linked to at least one information entry;
    a speech reception means for receiving a speaker independent speech input in more than one language during a speech reception mode;
    a processor to determine the more than one language of the speech input in a manner such that appropriate speech reception mode correlating to the language of the speech is capable of being automatically set, the speech input being filtered to extract meaningful media information; and
    the processor being able to compare the speech input received during the speech reception mode with the entries in the index,
    wherein the file is accessed when the speech input coincides with at least one of the information entries in the index.

12. The apparatus of claim 11, wherein the apparatus is selected from the group comprising: desktop computer, notebook computer, PDA, portable media player and mobile phone.

13. The apparatus of claim 11, wherein the speech reception means is a microphone.

14. The apparatus of claim 11, wherein the appropriate speech reception mode correlating to the language of the speech is further capable of being manually set.

15. The apparatus of claim 11, wherein the digital file is selected from the group comprising: documents, spreadsheets, playlists, folders, music files, image files and video files.

16. The apparatus of claim 11, wherein the information entries comprise at least one word.

17. The apparatus of claim 11, wherein the information entry obtains information from the digital file selected from the group comprising: file name, file extension, song title from file metadata, artiste name from file metadata, truncated song title from file metadata, truncated artiste name from file metadata, translated song title, alternative song title and any of the aforementioned from a remote source.

18. The apparatus of claim 11, wherein the information entry is in any language and is dependent on at least one character codeset.

19. The apparatus of claim 15, wherein the speech input is in a form of a phrase.

20. The apparatus of claim 11, wherein the at least one digital file is received from a source selected from the group comprising: a memory device, a wired computer network and a wireless computer network.

21. The apparatus of claim 11, further including a display.

* * * * *